(12) United States Patent
Ishida

(10) Patent No.: US 7,593,585 B2
(45) Date of Patent: Sep. 22, 2009

(54) IMAGE PROCESSING APPARATUS AND METHOD THEREFOR

(75) Inventor: Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 10/868,922

(22) Filed: Jun. 17, 2004

(65) Prior Publication Data

US 2005/0025376 A1 Feb. 3, 2005

(30) Foreign Application Priority Data

Jul. 31, 2003 (JP) ............................. 2003-283944
Mar. 17, 2004 (JP) ............................. 2004-077046

(51) Int. Cl.
*G06K 9/40* (2006.01)

(52) U.S. Cl. ....................... 382/254; 382/118; 382/270; 382/286

(58) Field of Classification Search ......... 382/115–119, 382/162, 163, 254
See application file for complete search history.

(56) References Cited

U.S. PATENT DOCUMENTS

| 5,982,912 | A | 11/1999 | Fukui et al. ................. 382/118 |
| 7,013,042 | B1 | 3/2006 | Yamada et al. .............. 382/167 |
| 7,039,222 | B2* | 5/2006 | Simon et al. ................ 382/118 |
| 7,106,887 | B2* | 9/2006 | Kinjo .......................... 382/118 |
| 2002/0081032 | A1 | 6/2002 | Chen et al. ................... 709/232 |
| 2003/0053663 | A1* | 3/2003 | Chen et al. ................... 382/117 |
| 2004/0022435 | A1 | 2/2004 | Ishida ......................... 382/190 |
| 2006/0204034 | A1* | 9/2006 | Steinberg et al. ............. 382/103 |

FOREIGN PATENT DOCUMENTS

| EP | 1 128 316 A1 | 8/2001 |
| JP | 8-63595 | 3/1996 |
| JP | 9-233423 | 9/1997 |
| JP | 9-251534 | 9/1997 |
| JP | 11-185026 A | 7/1999 |
| JP | 11-339035 | 12/1999 |
| JP | 2000-123164 | 4/2000 |
| JP | 2000-123165 | 4/2000 |
| JP | 2000-322588 | 11/2000 |
| JP | 2001-218015 | 8/2001 |
| JP | 2001-309225 | 11/2001 |

(Continued)

OTHER PUBLICATIONS

Notification for JP 2004-077046 dated Aug. 10, 2007.

(Continued)

*Primary Examiner*—Matthew C Bella
*Assistant Examiner*—Eric Rush
(74) *Attorney, Agent, or Firm*—Fitzpatrick, Cella, Harper & Scinto

(57) ABSTRACT

An image processing method includes the steps of inputting image data representing an input image, acquiring an image size of a face image which has the maximum image-face size contained in the input image, and correcting the image data using a first correcting condition in accordance with the acquired image size. An image processing apparatus includes an input section, an acquisition section, and a corrector, performing the input, acquiring, and correction steps, respectively. A computer-readable storage medium storing a computer-executable program for causing a computer to perform an image processing method including the input, acquiring, and correction steps.

5 Claims, 9 Drawing Sheets

FOREIGN PATENT DOCUMENTS

| | | |
|---|---|---|
| JP | 2002-183731 | 6/2002 |
| JP | 2004-120224 | 4/2004 |

OTHER PUBLICATIONS

Partial English translation of Japanese Document No. JPA09-233423.

Alan L. Yuille, Peter W. Hallinan, and David S. Cohen, "Feature Extraction from Faces Using Deformable Templates", IJCV, vol. 8:2, pp. 99-111, 1992.

Shizuo Sakamoto, Yoko Miyao and Johji Tajima, "Extracting Feature Points on Human Eye Photographs", IEICE transactions D-11, vol. J76-D-11, No. 8, pp. 1796-1804, Aug. 1993.

Alex Pentland, Baback Moghaddam, Thad Starner "View-Based and Modular Eigenspaces for Face Recognition", IEEE CVPR '94, pp. 84-91, 1994.

Tsutomu Sasaki, Shigeru Akamatsu, and Yasuhito Suenaga, "Face Image Normalization Based On Color Information For Face Recognition", IE 91-2, pp. 9-15, 1991.

Japanese Office Action issued Jan. 30, 2009, in Japanese Application No. 2004-077046.

\* cited by examiner

FIG. 5

| NUMBER N OF FACES CONTAINED IN IMAGE |
|---|

FIRST FACE DATA:
| CENTRAL POSITION COORDINATE x1 OF FIRST FACE |
|---|
| CENTRAL POSITION COORDINATE y1 OF FIRST FACE |
| HORIZONTAL SIZE H1 OF FIRST FACE |
| VERTICAL SIZE V1 OF FIRST FACE |

SECOND FACE DATA:
| CENTRAL POSITION COORDINATE x2 OF SECOND FACE |
|---|
| CENTRAL POSITION COORDINATE y2 OF SECOND FACE |
| HORIZONTAL SIZE H2 OF SECOND FACE |
| VERTICAL SIZE V2 OF SECOND FACE |

NTH FACE DATA:
| CENTRAL POSITION COORDINATE xN OF NTH FACE |
|---|
| CENTRAL POSITION COORDINATE yN OF NTH FACE |
| HORIZONTAL SIZE HN OF NTH FACE |
| VERTICAL SIZE VN OF NTH FACE |

F I G. 8
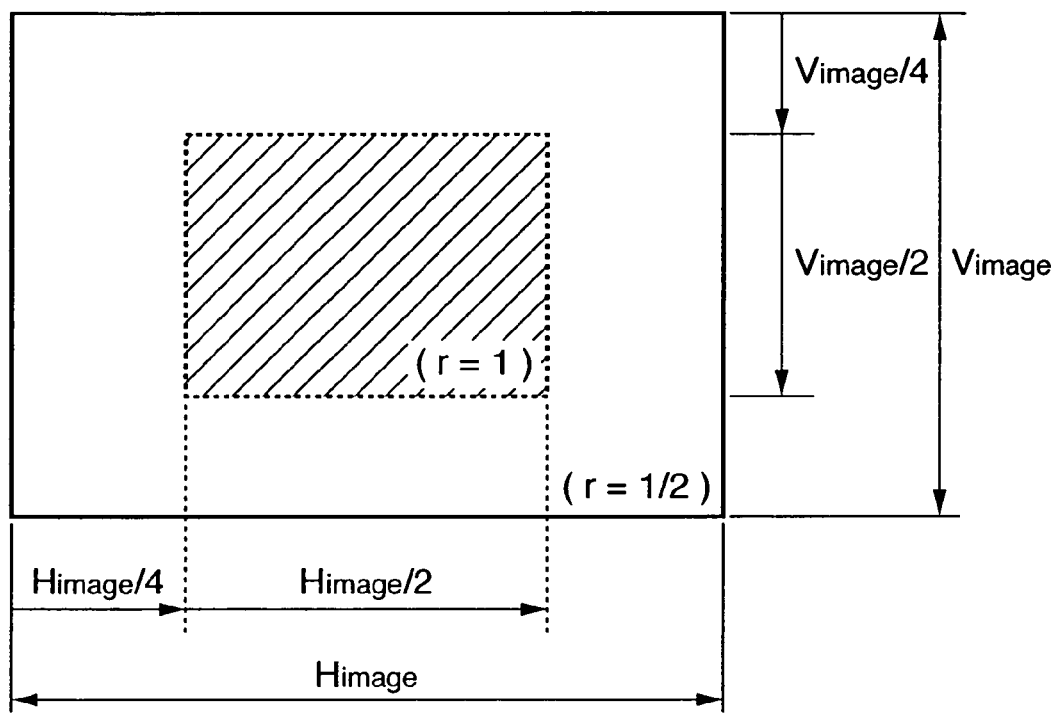

IMAGE PROCESSING APPARATUS AND METHOD THEREFOR

FIELD OF THE INVENTION

The present invention relates to an image processing apparatus and method therefor and, more particularly, to adaptive image processing corresponding to the image sensing scene of an image input from an image input device such as an image sensing apparatus.

BACKGROUND OF THE INVENTION

Image sensing apparatuses and, more specifically, digital still cameras (to be referred to as "digital cameras" hereinafter) which are recently becoming popular have various kinds of image processing functions including an exposure amount adjusting function called AGC (Auto Gain Control) to cause the luminance range of an object to fall within the dynamic range of an image sensing device on the basis of an image signal obtained by the image sensing device comprising a sensor such as a CCD or CMOS, a tinted image adjusting function called AWB (Auto White Balance) to correct a tinted object image to an image having an appropriate tone, a gamma conversion function to adjust the change in gray level or contrast, a noise removal function, and an edge enhancement function. There is recently an intention to put intelligence in such processing for an image sensing signal, as disclosed in, e.g., Japanese Patent Laid-Open Nos. 2000-123164 and 2000-123165.

Japanese Patent Laid-Open No. 2000-123164 describes that it is more preferable to change the degree of processing or conversion in accordance with a characteristic feature in an image than to execute predetermined processing without considering the characteristic feature in the image. Japanese Patent Laid-Open No. 2000-123165 discloses attaching weight to the main object in an image, i.e., image correction appropriate for the main object.

As is known, in reproducing an image by displaying a sensed image on a display screen or making a hard copy of an image by using a color printer, image enhancement processing or image correction processing (the manner of color reproduction or contrast adjustment for skin color) for a portrait containing a person as a main object is executed in a manner different from that for images of other types so that the reproduced image can make a good impression on an observer.

For conventional silver halide photos, when a positive picture is printed from a color negative film with an image of a person after adjusting his/her complexion to an appropriate color, generally, a good impression can be made on the observer of the photo. That is, when the print exposure amount is decided on the basis of the color of the face of a person, the image quality can be increased, as is known.

There are disclosed several methods of extracting the face of a person from a sensed image. For example, Japanese Patent Laid-Open No. 2001-309225 discloses a technique for detecting a face by using a first algorithm of face candidate detection and a second algorithm. The first algorithm uses a pattern recognition operator, in which a central portion which is supposed to contain skin at a high probability is searched for on the basis of the color and shape, and additionally, a peripheral region which is supposed to contain hair at a high probability is searched for on the basis of the color and shape, thereby searching for a region which contains a face at a high probability. In the second algorithm, the presence of the face in the face candidate region obtained by the first algorithm is confirmed by pattern matching.

Japanese Patent Laid-Open No. 08-063595 discloses a method of extracting the contour of a skin color region on the basis of the color and detecting a face by matching with a face contour template prepared in advance, a method of obtaining an eye candidate region and detecting a face by matching with an eye template, and a method of obtaining a feature factor which is defined from the two-dimensional Fourier transform result of a face candidate region obtained by a face contour template and the two-dimensional Fourier transform result of a face template image prepared in advance and containing eyes, nose, mouth, and hair, and executing threshold processing of the feature factor to detect a face.

In the method disclosed in Japanese Patent Laid-Open No. 2002-183731, an eye candidate region is obtained. If a plurality of eye candidates are detected, an annular region is defined near each arbitrary pair of eye candidates. Then, a face is detected on the basis of the direction difference between the pixel value gradient of each pixel in the region with respect to a neighboring pixel and a predetermined reference gradient.

There is also proposed a technique for detecting the face region of a person or detecting a face component such as an eye, nose, or mouth in order to generate a synthesized face image for personal authentication or amusement. In the technique disclosed in, e.g., Japanese Patent Laid-Open No. 09-251534, a face region is detected by using a standard face image (template) registered in advance. Candidates of a feature factor such as an eyeball (pupil) or naris are extracted from the extracted face region. A face component such as an eye, nose, or mouth is detected on the basis of the layout of the feature factor candidates or the similarity to a template of an eye, nose, or mouth, which is registered in advance.

In the technique described in Japanese Patent Laid-Open No. 2000-322588, a face region is determined from an input image. A face component such as an eye, nose, or mouth is detected from the determined face region, and the central coordinate position of the pupil in the eye or the central coordinate position of the naris is output. Alternatively, the position of the mouth or other face component is detected, and its position is output.

When the above-described techniques, i.e., the techniques for extracting the face of a person contained in an image are used, the position and size of the face of a person in the image and the number of faces that exist in the image can be grasped. On the other hand, only uniform image processing is generally executed for a portrait even through it is adaptive processing. Hence, no suitable output image can always be obtained for all portraits. From the viewpoint of such a situation, there is a demand for a mechanism which automatically executes image input, face information acquisition, and high quality processing based on the input data in adjusting the reproduction tone in printing a photo image depending on whether the main object is a person. In addition, finer adjustment considering the size and position of the face is demanded.

SUMMARY OF THE INVENTION

According to the first aspect of the present invention, there is disclosed inputting an image to be processed, acquiring, from the image, face information about a face image of a person contained in the image, generating, on the basis of the acquired face information, adjustment information which adjusts high quality processing, and executing the high quality processing adjusted on the basis of the adjustment information for the image to be processed.

According to the second aspect of the present invention, there is disclosed setting a first image processing condition for a face image and a second image processing condition for a non-face image, inputting an image, acquiring face information about a face image contained in the image, generating a weighting parameter from the face information, and executing image processing for the image by using the weighing parameter, the first image processing condition, and the second image processing condition.

According to these arrangements, adaptive image processing for a portrait can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a view showing a format of face information written in the first area of a face information memory;

FIGS. 8 and 9 are views for explaining the third embodiment which takes a face position into consideration.

DETAILED DESCRIPTION OF THE PREFERRED EMBODIMENTS

Image processing according to the embodiments of the present invention will be described below in detail with reference to the accompanying drawings.

First Embodiment

[Arrangement]

Figure 1:
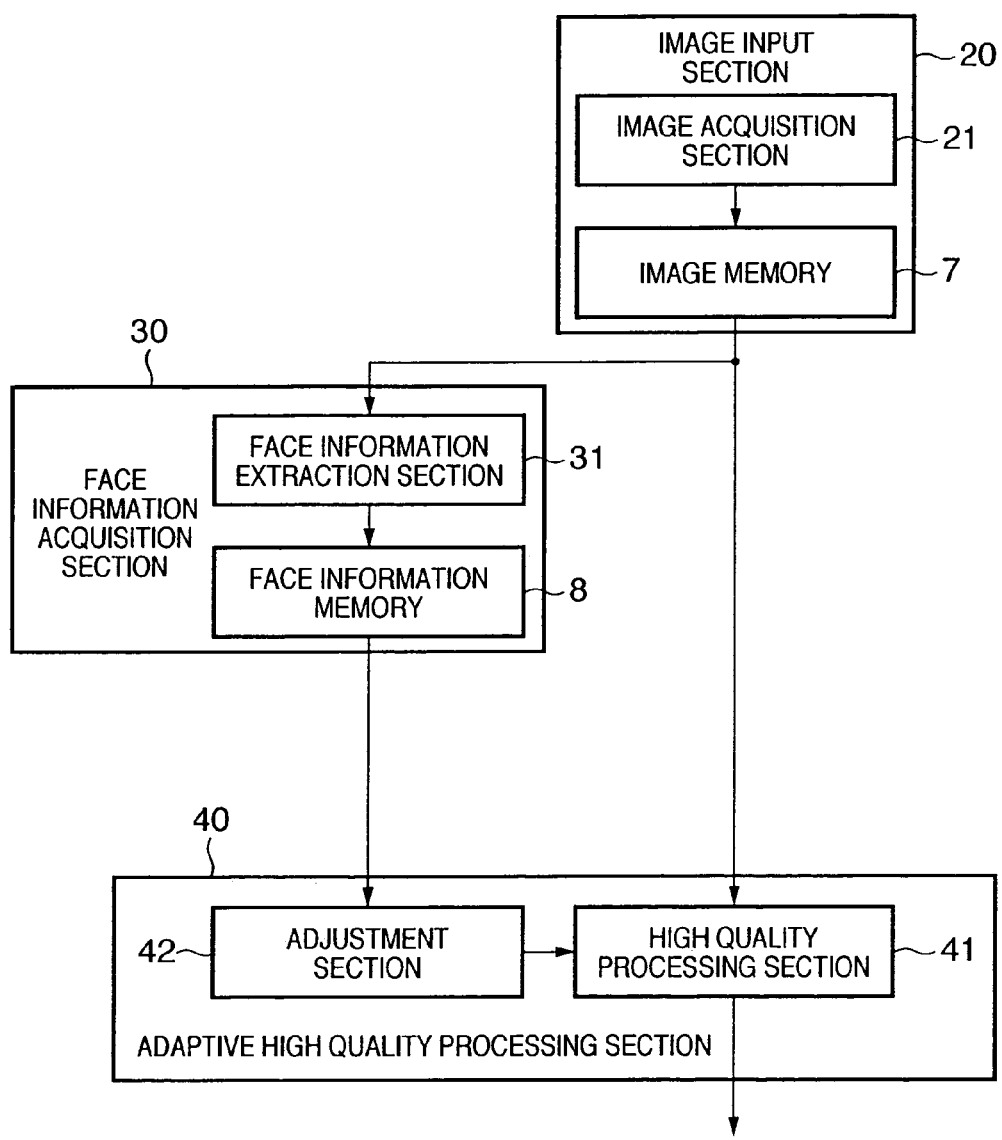
FIG. 1 is a functional block diagram of an image processing apparatus.

FIG. 1 is a functional block diagram of an image processing apparatus.

An image input section 20 includes an image acquisition section 21 such as an interface circuit which receives image data obtained by a digital camera or the like, and an image memory 7 which holds the received image data. The image input section 20 acquires image data obtained by photographing a scene including the main object. The image data acquired by the image input section 20 is input to a face information extraction section 31 in a face information acquisition section 30 as digital image data and also input to a high quality processing section 41 in an adaptive high quality processing section 40.

The face information extraction section 31 detects a face image from the image received from the image memory 7 in the image input section 20. When a face image is detected, the detection result (face information containing the number of face images, the position of each face image, and the size of each face image) is stored in a face information memory 8. In the following description, a face image will simply be expressed as a "face".

An adjustment section 42 in the adaptive high quality processing section 40 receives, from the face information memory 8, face information contained in the target image of adaptive high quality processing. On the basis of the information, the adjustment section 42 generates adaptive processing adjustment information to adjust the contents of portrait processing which should be executed for the process target image by the high quality processing section 41 and supplies the adaptive processing adjustment information to the high quality processing section 41.

The high quality processing section 41 adjusts high quality processing on the basis of the adaptive processing adjustment information supplied from the adjustment section 42, executes high quality processing for the process target image received from the image memory 7, and outputs an image as a processing result.

Figure 2:
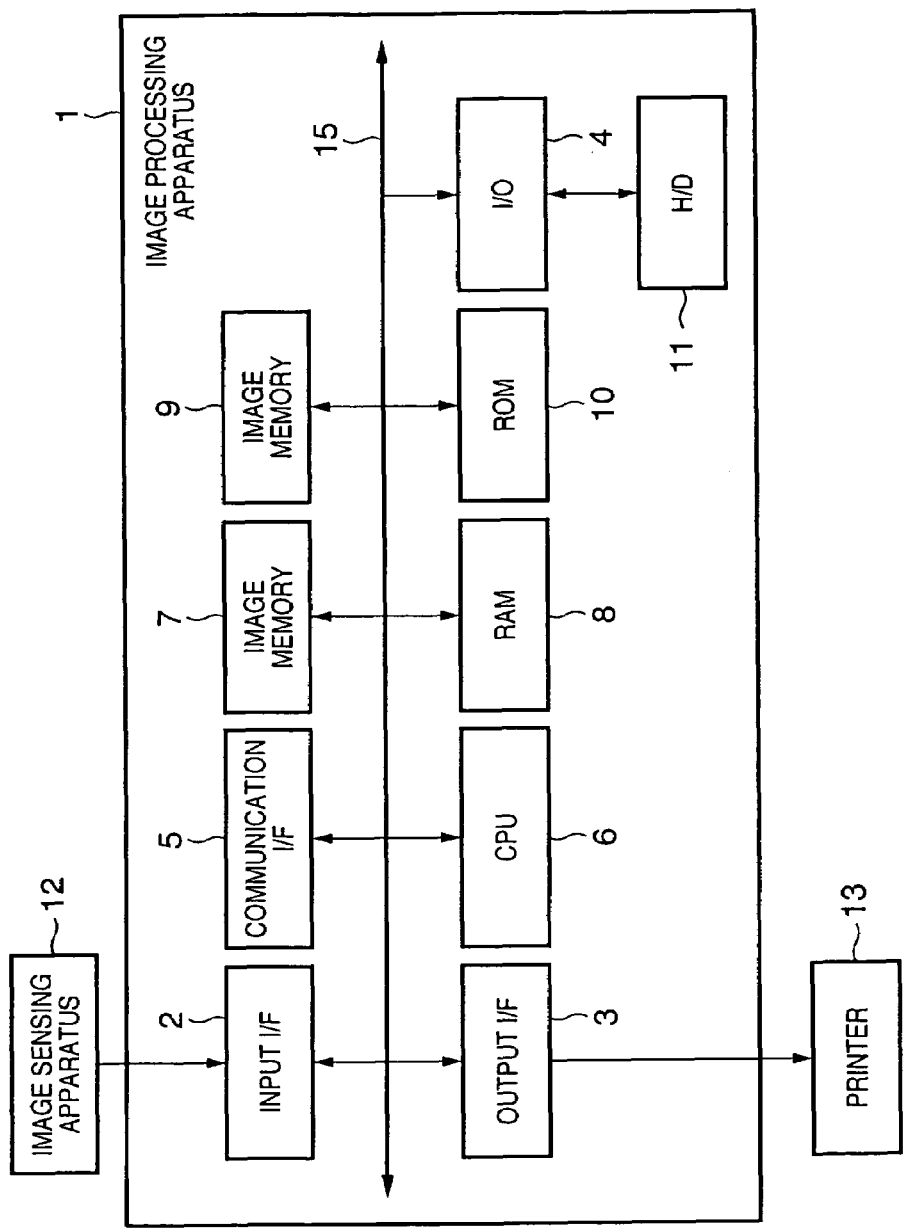
FIG. 2 is a block diagram showing the arrangement of the image processing apparatus which implements the functional blocks shown in FIG. 1.

FIG. 2 is a block diagram showing the arrangement of an image processing apparatus 1 which implements the above-described functional blocks.

An input interface (I/F) 2 corresponds to the image acquisition section 21 in the image input section 20 shown in FIG. 1. The input I/F 2 is also used to receive attribute data associated with the input image, like the image data. An output I/F 3 is an interface that outputs an image to a printer 13 or the like. A communication I/F 5 is an interface to communicate with an external device of the system shown in FIG. 2 through various networks.

The image memories 7 and 9 are memories which hold a process target image. As shown in FIG. 1, the image memory 7 constitutes the image input section 20 and holds an input image. The image memory 9 temporarily holds an image which is being processed by the face information extraction section 31 or an image as a processing result by the high quality processing section 41.

A CPU 6 executes a program stored in a ROM 10 or hard disk device (H/D) 11 or a program input through the communication I/F 5 by using a RAM 8 as a work memory. The RAM 8 constitutes the face information acquisition section 30, as shown in FIG. 1. An input/output circuit (I/O) 4 is an interface which provides data input/output to/from the H/D 11.

The components shown in FIG. 2 are connected to each other through a system bus 15 to form a computer system. When the CPU 6 executes a program, the functional blocks of the image acquisition section 21, face information extraction section 31, adjustment section 42, and high quality processing section 41 shown in FIG. 1 are implemented.

An image sensing apparatus 12 such as a digital camera supplies image data or data attached to the image data to the image input section 20 shown in FIG. 1.

[Processing]

Figure 3:
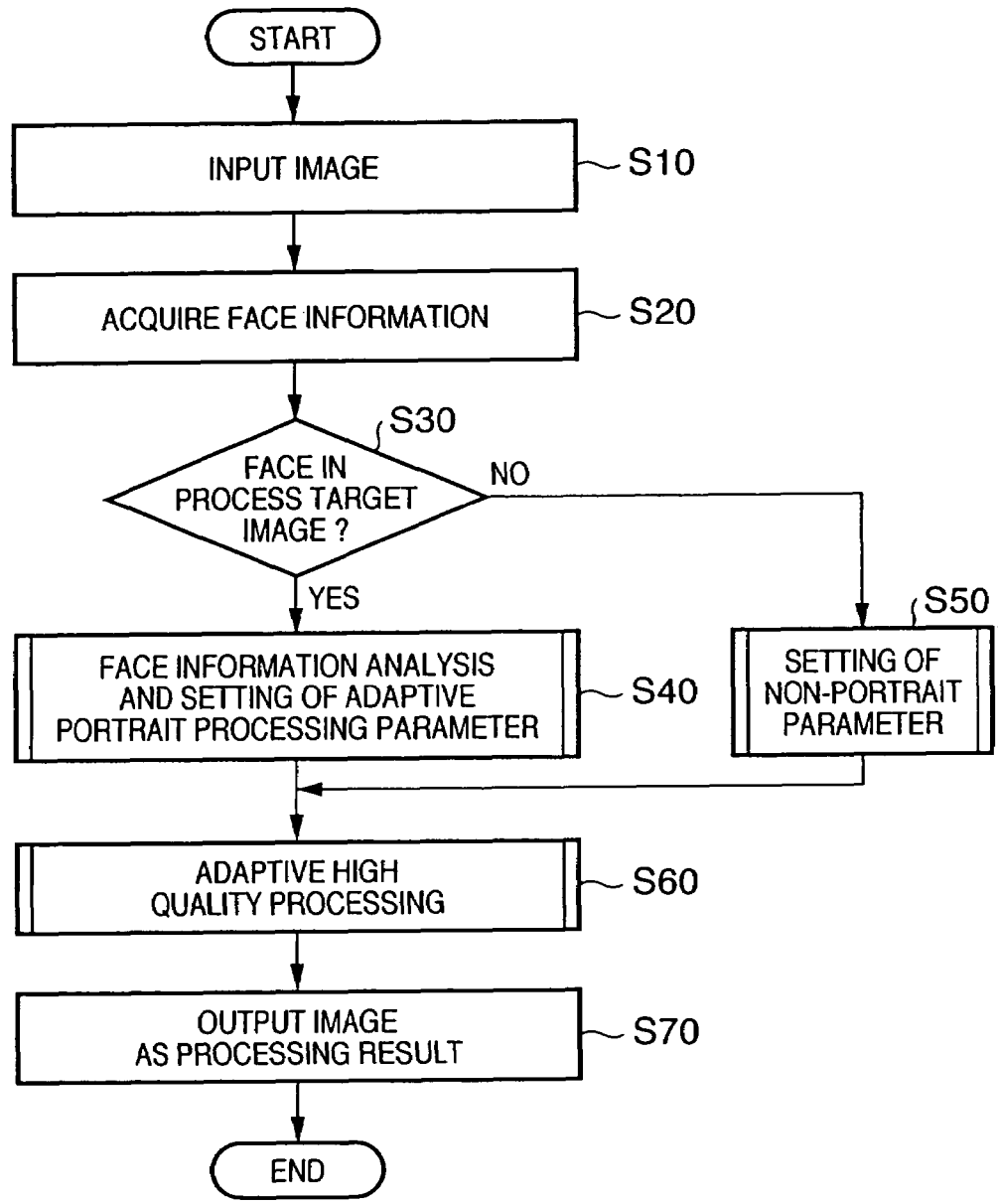
FIG. 3 is a flowchart showing processing by the image processing apparatus.

FIG. 3 is a flowchart showing processing by the image processing apparatus 1. The processing is executed by the CPU 6.

Figure 9:
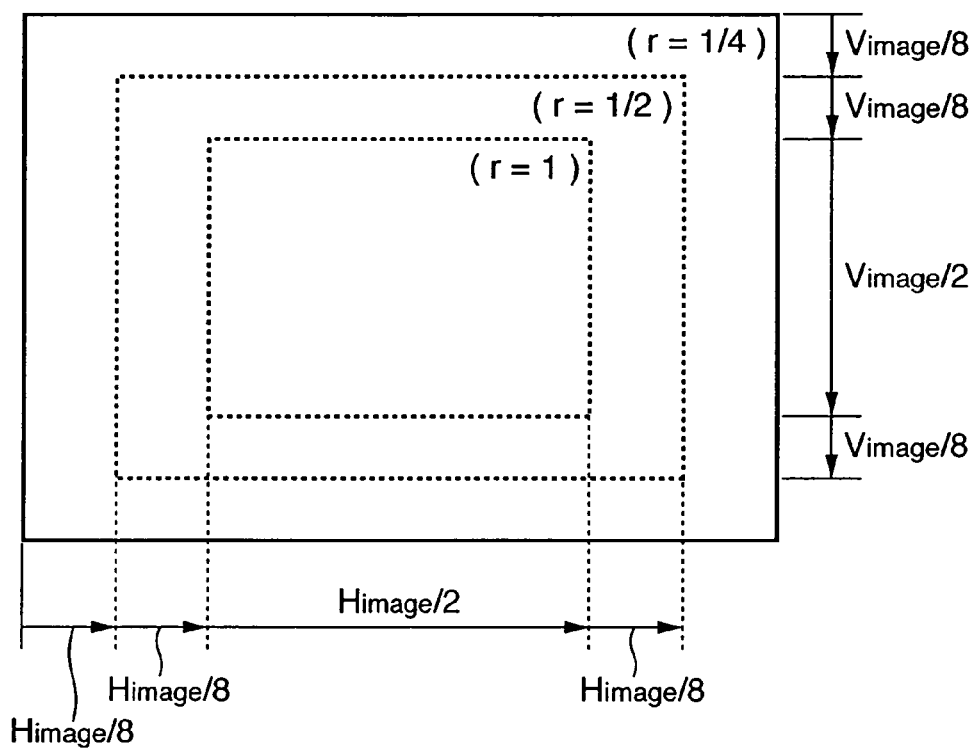

When the processing starts, the process target image is loaded from the image sensing apparatus 12 through the input I/F 2 and stored in the image memories 7 and 9 (S10). The process target image stored in the image memory 9 is analyzed to acquire face information related to the face of a person contained in the process target image. The face information is written in the first area of the face information memory of the RAM 8 (S20). The face information may be detected from the entire image or from a predetermined view angle range such as the central portion shown in FIG. 8 or 9.

It is determined on the basis of the face information written in the first area of the face information memory whether a significant personal face is contained in the process target image (S30). If there is face information representing the presence of a significant personal face, the flow advances to step S40. Otherwise, the flow advances to step S50.

In step S40, adaptive processing adjustment information which adjusts the contents of portrait high quality processing to be executed for the process target image is generated from the face information about the personal face contained in the process target image and written in the second area of the face information memory. In step S50, adaptive processing adjustment information for a process target image containing no-significant personal image, i.e., adaptive processing adjustment information to execute non-portrait high quality processing for the process target image is generated and written in the second area of the face information memory.

Next, on the basis of the adaptive processing adjustment information written in the second area of the face information memory, adjusted high quality processing is executed for the process target image stored in the image memory 7. An image obtained as a processing result is stored in the image memory 9 (S60).

The processed image stored in the image memory 9 is written in the H/D 11 through the I/O 4, output through the communication I/F 5 to another external system which synchronizes with the image sensing apparatus 12, output to the printer 13 through the output I/F 3 to print an image, or sent to another image processing process executed on the computer system shown in FIG. 2 (S70). Then, the processing is ended.

[Face Information Acquisition Processing]

The face information acquisition processing executed in step S20 can be constituted by the technique disclosed in Japanese Patent Laid-Open No. 2002-183731 described above. In the technique disclosed in this reference, an eye candidate region is obtained. If a plurality of eye candidates are detected, an annular region is defined near each arbitrary pair of eye candidates. Then, a face is detected on the basis of the direction difference between the pixel value gradient of each pixel in the region with respect to a neighboring pixel and a predetermined reference gradient.

The technique disclosed in Japanese Patent Laid-Open No. 09-251534 can also be applied. More specifically, a face region is detected from a process target image. A feature factor such as a pupil, nose, or mouth is extracted from the extracted face region. In this method, basically, a candidate of a feature factor is obtained on the basis of shape information with high position accuracy, and the candidate is verified by pattern collation.

Alternatively, a method based on edge information (e.g., Alan L. Yuille, Peter W. Hallinan, and David S. Cohen, "Feature Extraction from Faces Using Deformable Templates", IJCV, vol. 8:2, pp. 99-111, 1992; Shizuo Sakamoto, Yoko Miyao, and Johji Tajima, "Extracting Feature Points on Human Eye Photographs", IEICE transactions D-11, Vol. J7-D11, No. 8, pp. 1796-1804, August, 1993), or Eigenfeature method using an eigenspace method (e.g., Alex Pentland, Baback Moghaddam, Thad Starner, "View-Based and Modular Engenspaces for Face Recognition", CVPR'94, pp. 84-91, 1994), or a method based on color information (e.g., Tsutomu Sasaki, Shigeru Akamatsu, and Yasuhito Suenaga, "Face Image Normalization Based On Color Information For Face Recognition", IE91-2, pp. 9-15, 1991) can be applied.

According to these methods of extracting the face of a person contained in an image, the position and size of the face of a person in the image and the number of faces that exist in the image can be grasped.

[Face Information]

Figure 4:
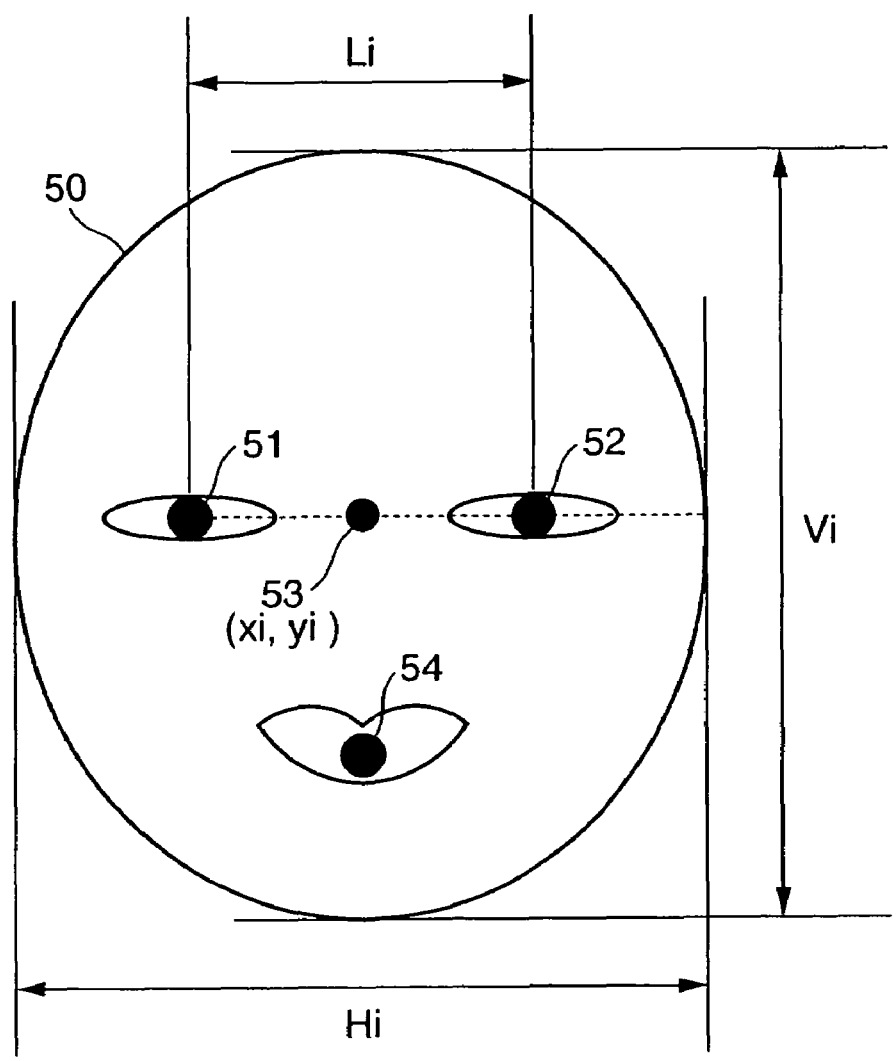
FIG. 4 is a view for explaining typical face information detected from an image.

FIG. 4 is a view for explaining typical face information detected from an image. Face information contains information representing a contour 50 of a detected face, a center 51 of the right eye, a center 52 of a left eye, a central position 53 between the eyes, and a center 54 of the mouth. When this face information represents the ith face detected from the image, the information contains a horizontal width Hi of the face, a vertical width Vi of the face, and a distance Li between the centers of the eyes in the face.

FIG. 5 is a view showing a format of face information written in the first area of the face information memory of the RAM 8. The face information contains a number N of (significant) faces contained in the image and subsequently, as the information group of the first face, central position coordinates (coordinate values) x1 and y1 of the first face and a horizontal width H1 and vertical width V1 of the first face. Then, the information groups of the second to Nth faces follow. As described above, the information of one face (e.g., the ith face) contains the central position (xi,yi) of the face, and the horizontal width Hi and vertical width Vi of the face. The first face information to the Nth face information are stored next to the information of the number N of faces contained in the image. When N=0, no face information is present. Only the information of the number N (=0) of faces contained in the image is stored. As the central position of the face, the central position 53 between the eyes shown in FIG. 4 is used. For coordinates, for example, the upper left pixel position of the image is defined as the origin, and the X-axis is defined rightward while the Y-axis is defined downward from the origin.

For an image to which face information extracted by the above method is attached as attribute information outside the apparatus, face information is acquired from the attribute information in step S20.

In step S30, the number N of faces contained in the image is checked. When N>0, it can be determined that the process target image contains a significant personal face. When N=0, it can be determined that the process target image contains no significant personal face.

[Adaptive Processing Adjustment Information]

Adaptive processing adjustment information will be described next. The adaptive processing adjustment information is closely related with the contents of high quality processing executed in step S60. A description will be done below assuming that the high quality processing is skin color correction processing.

A person generally has an image of human skin color (memorized color). When an image of a person is to be reproduced in a color print or on a display, people tend to prefer color reproduction based on the memorized color better than the faithful reproduction of actual skin color. Skin color correction processing is color reproduction processing for a portrait containing a person as the main object, in which the human skin color is corrected to the color appearance of the memorized color instead of faithfully reproducing the skin color.

Figure 6A:
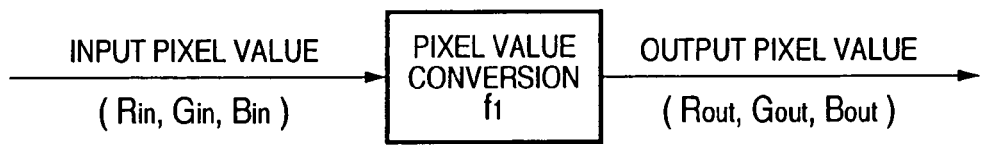
FIGS. 6A and 6B are views for explaining pixel value conversion processing.
Figure 6B:
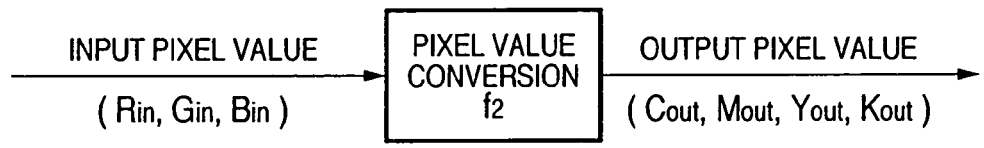

When the image is to be output to a display, pixel values (Rin, Gin, Bin) of the input image are converted into pixel values (Rout, Gout, Bout) of the output image that has undergone the correction processing (FIG. 6A). When the image is to be output to a color print, the pixel values (Rin, Gin, Bin) of the input image are converted into pixel values (Cout, Mout, Yout, Kout) of the output image that has undergone the correction processing (FIG. 6B).

In an image (e.g., a landscape) which is not a portrait, if skin color correction processing is executed, a color which is not the human skin color but accidentally belongs to the skin color region is corrected and reproduced. This rather gives a sense of incompatibility. To prevent this, in this embodiment, pixel value conversion processing f1 for executing skin color correction for an image to be output to a display, pixel value conversion processing f1' without skin color correction, pixel value conversion processing f2 for executing skin color correction for an image to be output as a color print, and pixel value conversion processing f2' without skin color correction are prepared.

In the processing in steps S40 and S50, a coefficient k ($0 \leq k \leq 255$) that decides the mixing ratio (to be described later in detail) in pixel value conversion processing is decided from the face information obtained in step S20.

Figure 7:
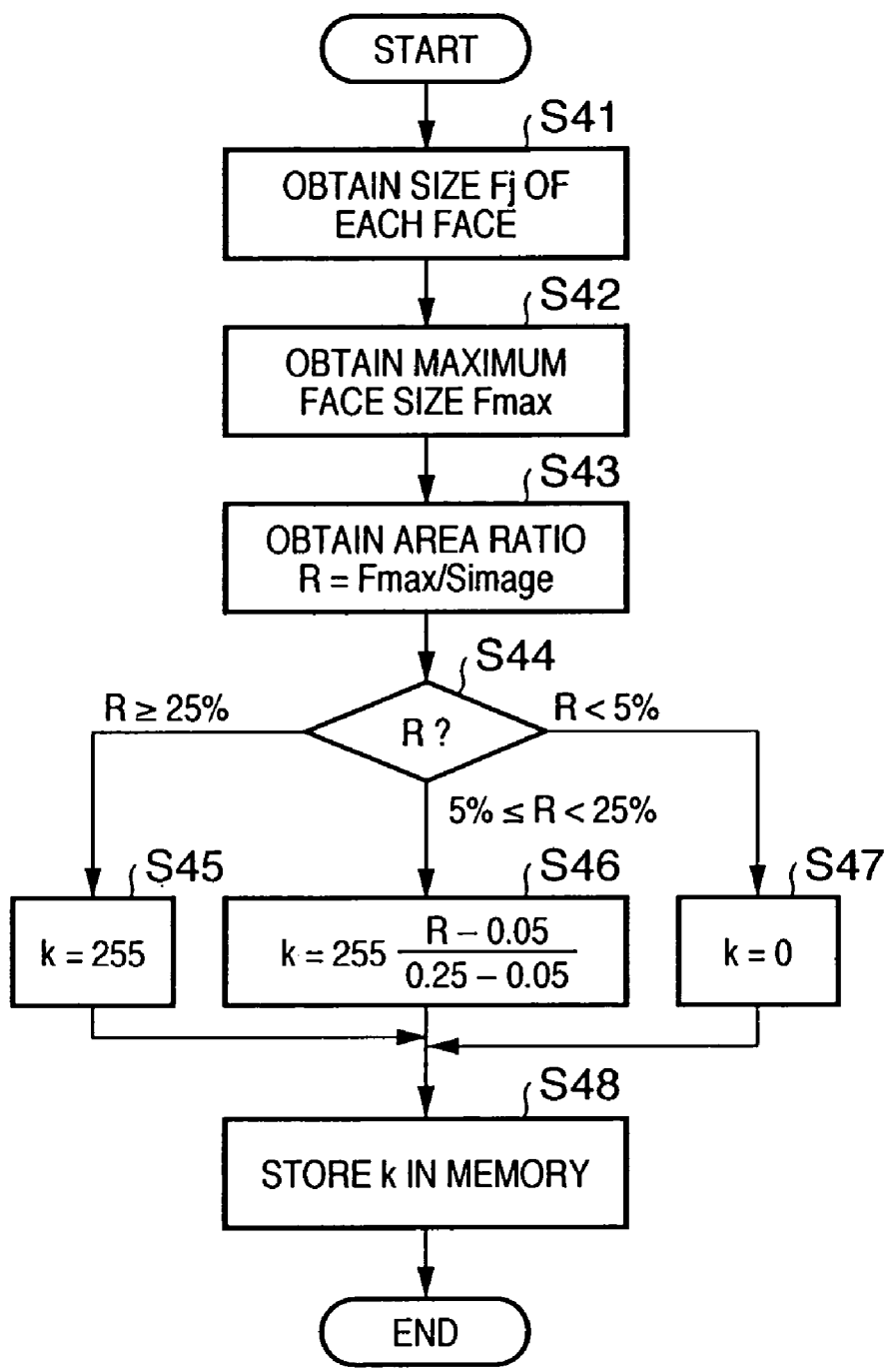
FIG. 7 is a flowchart showing details of processing in step S40.

FIG. 7 is a flowchart showing details of processing in step S40.

When the number of faces contained in the image is N>0, in step S40, a face size Fmax (=max(Fj)) corresponding to the maximum value of a face size Fj (=Hj×Vj, $1 \leq j \leq N$) is obtained (S41 and S42), an area ratio R (=Fmax/Simage) of Fmax to a size Simage (=a vertical size Himage of the image×a horizontal image Vimage of the image) of the process target image is obtained (S43), and the coefficient k to be applied is decided on the basis of the area ratio R (S44 to S47).

When $R \geq 0.25$, k=255
When $0.25 > R \geq 0.05$, k=255×(R−0.05)/(0.25−0.05)
When R<0.05, k=0

That is, when the maximum face size is equal to or larger than 25% of the image size, k=255. When the maximum face size is smaller than 5% of the image size, k=0. When the maximum image size falls within the range of 5% (inclusive) to 25% (exclusive) of the image size, the values between 5% and 25% are proportionally allotted to values between 0 and 255. The coefficient k thus obtained is written in the second area of the face information memory as adaptive processing adjustment information (S48), and the processing advances to step S60.

In step S50, processing for a process target image containing no significant personal image (N=0) is executed. Hence, adaptive processing adjustment information, i.e., coefficient k=0 is written in the second area, and the processing advances to step S60.

In step S60, on the basis of the adaptive processing adjustment information, i.e., the coefficient k written in the second area, high quality processing (in this embodiment, skin color correction processing) is executed for the process target image loaded from the image memory 7.

In correspondence with the pixel values (Rin, Gin, Bin) of the input image, let (R1, G1, B1) be the pixel values which should be subjected to the skin color correction processing and output to a display, let (C2, M2, Y2, K2) be the pixel values which should be subjected to the skin color correction processing and output as a color print, let (R'1, G'1, B'1) be the pixel values which should be output to a display without skin color correction processing, and let (C'2, M'2, Y'2, K'2) be the pixel values for a color print without skin color correction processing. The pixel values (Rout, Gout, Bout) and (Cout, Mout, Yout, Kout) after the high quality processing are given by $$Rout=\{R1 \times k + R'1 \times (255-k)\}/255$$

$$Gout=\{G1 \times k + G'1 \times (255-k)\}/255$$

$$Bout=\{B1 \times k + B'1 \times (255-k)\}/255 \quad (1)$$

$$Cout=\{C2 \times k + C'2 \times (255-k)\}/255$$

$$Mout=\{M2 \times k + M'2 \times (255-k)\}/255$$

$$Yout=\{Y2 \times k + Y'2 \times (255-k)\}/255$$

$$Kout=\{K2 \times k + K'2 \times (255-k)\}/255 \quad (2)$$

As described above, according to the first embodiment, face information contained in a process target image is acquired. Adaptive processing adjustment information to adjust the contents of portrait processing to be executed for the process target image is generated on the basis of the face information. High quality processing adjusted on the basis of the adaptive processing adjustment information is executed for the process target image. Hence, adaptive image processing can be executed for the process target image depending on whether the image is a portrait and the area ratio of the maximum face contained in the image to the entire image.

Second Embodiment

Image processing according to the second embodiment of the present invention will be described below. The same reference numerals as in the first embodiment denote the same components in the second embodiment, and a detailed description thereof will be omitted.

In step S40 of the first embodiment, the coefficient k is decided on the basis of the maximum face size Fmax in faces contained in an image. In the second embodiment, when a plurality of faces are contained in an image, a coefficient k is decided on the basis of the plurality of pieces of face information. First, a coefficient kj is obtained for each face information.

When $Rj \geq 0.25$, kj=255
When $0.25 > Rj \geq 0.05$, kj=255×(R−0.05)/(0.25−0.05)
When Rj<0.05, kj=0

That is, when an area ratio Rj of each face size Fj is equal to or larger than 25%, kj=255. When the area ratio Rj is smaller than 5%, kj=0. When the area ratio Rj falls within the range of 5% (inclusive) to 25% (exclusive), the values between 5% and 25% are proportionally allotted to values between 0 and 255 to obtain the coefficient kj. A sum Σkj of the obtained coefficients kj is used as the coefficient k as adaptive processing adjustment information. If the sum exceeds 255, k=255. That is, in the second embodiment, the adaptive processing adjustment information is obtained in accordance with the sum of the areas of the plurality of faces.

According to the second embodiment, skin color correction processing can more intensively be applied to an image such as a group photograph containing a plurality of persons each having a small face size.

Third Embodiment

Image processing according to the third embodiment of the present invention will be described below. The same reference numerals as in the first embodiment denote the same components in the third embodiment, and a detailed description thereof will be omitted.

In the first and second embodiments, adaptive high quality processing is adjusted on the basis of the face size. In the third embodiment, adjustment is done while taking even the face position into consideration.

When a central position $(xj,yj)$ of a face having a face size Fj satisfies the following inequalities, a coefficient kj is decided in the same way as in the second embodiment. Otherwise, the value of the coefficient kj decided in the second embodiment is multiplied by a reduction ratio r (e.g., 1/2). A value r×kj thus obtained is used as the coefficient kj.

$$(Himage/4) < xj < (3 \times Himage/4)$$

and $$(Vimage/4) < yj < (3 \times Vimage/4)$$

That is, the adaptive processing adjustment information is decided by attaching weight to the face at the central portion of the image, which is indicated as a hatched region in FIG. 8, and more lightly handling faces in the remaining regions. With this method, the skin color correction processing can more intensively be applied to an image in which a face exists at the central portion and has a large occupation area. For an image which contains, as the main object, an object other than persons, and faces at the peripheral portion, the skin color correction processing can be suppressed so that the sense of incompatibility can be reduced even when the main object has a skin color.

The image region need not always be divided into two regions, i.e., the central portion (r=1) and the peripheral portion (r=1/2). The image region may be divided into three regions, i.e., the central portion (r=1), the peripheral portion (r=1/4), and an intermediate region (r=1/2) between them. The image region may also be divided into three parts including upper, intermediate, and lower regions or left, intermediate, and right regions. Alternatively, the image region may more finely be divided into, e.g., a total of nine regions (3×3 regions). When adaptive processing adjustment information is decided for each region, finer adaptive high quality processing can be implemented.

The value of the reduction ratio r in the above description and in FIGS. 7 and 8 is merely an example. The reduction ratio r is preferably obtained empirically to set an appropriate value.

Fourth Embodiment

In the first to third embodiments, methods of generating adaptive processing adjustment information considering the maximum face size, the size of each of a plurality of faces detected, and the position of a face in an image have been described as independent embodiments. However, the present invention is not limited to these embodiments. In the fourth embodiment, adaptive processing adjustment information is generated by combining the first to third embodiments. A concept of priority is added to each information. Each information is obtained from an input image, and ultimate adaptive processing adjustment information is generated by using the priority.

First, of pieces of face information contained in an image, the number of faces is preferentially checked. When the number of faces is equal to or larger than a predetermined threshold value (e.g., "8"), the image is determined as a group photograph. In this case, processing is executed without using the reduction ratio corresponding to the position of each face (or the reduction ratio is fixed to "1"), as described in the third embodiment. When the number of faces is smaller than the threshold value (the number of faces is 7 or less), the processing described in the third embodiment is executed. Alternatively, the combination of the number of faces and the size of each face is preferentially checked. If, for example, there is only one face, and the face size is equal to or larger than 15% of the image area, processing is executed without using the reduction ratio corresponding to the position of the face (or the reduction ratio is fixed to "1"), as described in the third embodiment. If the number of faces is two or three, and the face size ratio is, e.g., 0.8 to 1.25 for any combination of two faces, the image is determined as a twin shot (a shot containing two persons abreast as the main object) or a triple shot (a shot containing three persons abreast as the main object). In this case, the processing described in the second or third embodiment is not executed. Instead, the method described in the first embodiment is used to process all the faces equally.

With this method, unlike the adaptive processing adjustment mechanisms described in the first to third embodiments, which uniformly consider the maximum face size, the size of each of a plurality of faces detected, and the position of a face in an image, an adaptive processing adjustment mechanism which is more highly adaptable to the situation of a personal face determined as the main object in an image can be implemented.

Modification of Embodiments

In the above embodiments, the high quality processing has been described as skin color correction processing. For example, noise removal processing can be applied to the high quality processing. More specifically, noise processing using a spatial filter for smoothing is combined with the high quality processing. Adaptive high quality processing is implemented by adaptively switching the kernel size (M or N of an M×N spatial filters) or filter coefficient of the spatial filter.

When an image is determined as a portrait, noise removal processing (smoothing) may be executed by setting, in the spatial filter, a filter coefficient which forms a low-pass filter. When an image is determined as a non-portrait, sharpening processing for increasing the sharpness of the image may be executed by setting, in the spatial filter, a filter coefficient which forms a high-pass filter or edge enhancement processing. At this time, adaptive processing adjustment information which adjusts the filter coefficient is generated on the basis of face information.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An image processing method performed by an image processing apparatus comprising the steps of:
   inputting into the image processing apparatus image data representing an input image which contains a plurality of face images;
   detecting with a detector of the image processing apparatus plural face-image areas corresponding to the plurality of face images;
   calculating with a calculator of the image processing apparatus a ratio of a size of each of the plural face-image areas to an input-image size;
   setting with a setting section of the image processing apparatus a correcting condition based on the sum of a plurality of ratios of the plural face-image areas calculated in the calculating step; and
   correcting with a corrector of the image processing apparatus the image data of the plural face-image areas and another image area of the input image data using the correcting condition.

2. The method according to claim 1, wherein the setting step sets the correcting condition based on the ratio and a position of each of the plural face-image areas.

3. The method according to claim 1, further comprising the step of counting the number of the plural face-image areas, wherein the setting step sets the correcting condition in accordance with the calculated ratios and the counted number.

4. An image processing apparatus comprising:
   an input section, arranged to input image data representing an input image which contains a plurality of face images;
   a detector, arranged to detect plural face-image areas corresponding to the plurality of face images;
   a calculator, arranged to calculate a ratio of a size of each of the plural face-image areas to an input-image size;
   a setting section, arranged to set a correcting condition based on the sum of a plurality of ratios of the plural face-image areas calculated by the calculator; and
   a corrector, arranged to correct the image data of the plural face-image areas and another image area of the input image data using the correcting condition.

5. A computer-readable storage medium storing a computer-executable program causing a computer to perform an image processing method, the method comprising the steps of:
   inputting image data representing an input image which contains a plurality of face images;
   detecting plural face-image areas corresponding to the plurality of face images;
   calculating a ratio of a size of each of the plural face-image areas to an input-image size;
   setting a correcting condition based on the sum of a plurality of ratios of the plural face-image areas calculated in the calculating step; and
   correcting the image data of the plural face-image areas and another image area of the input image data using the correcting condition.

* * * * *